United States Patent [19]

Betz

[11] 4,170,629
[45] Oct. 9, 1979

[54] METHOD OF CONVERTING HYDROCARBON WASTE GAS STREAMS USING A NON-UNIFORM CRIMPED METAL RIBBON PACKED CATALYST BED

[76] Inventor: Erwin C. Betz, 524 Mill Vallye Rd., Palatine, Ill. 60067

[21] Appl. No.: 844,744

[22] Filed: Oct. 25, 1977

Related U.S. Application Data

[62] Division of Ser. No. 613,544, Sep. 15, 1975, Pat. No. 4,065,268.

[51] Int. Cl.² .............................................. B01D 53/34
[52] U.S. Cl. ................................... 423/245; 423/213.2
[58] Field of Search .............................. 423/245, 213.2; 252/477 R; 55/521, 527, 529; 261/DIG. 72; 23/288 R, 288 FC

[56] References Cited

U.S. PATENT DOCUMENTS

| | | | |
|---|---|---|---|
| 2,004,865 | 6/1938 | Grisom | 423/213.2 X |
| 2,245,840 | 6/1941 | Webb | 55/527 X |
| 2,331,693 | 10/1943 | Jacobs et al. | 55/527 |
| 2,658,742 | 11/1953 | Suter et al. | 55/521 X |
| 2,974,150 | 3/1961 | McClements et al. | 252/477 R |
| 3,087,233 | 4/1963 | Turnbull | 55/527 |
| 3,254,966 | 6/1966 | Bloch et al. | 252/477 R X |

Primary Examiner—Earl C. Thomas
Attorney, Agent, or Firm—Hume, Clement, Brinks, Willian & Olds, Ltd.

[57] ABSTRACT

A catalyst bed packed with metal ribbon strands having a number of different crimped configurations is disclosed. Also disclosed is a method of converting hydrocarbon waste gas streams which utilizes the multi-configurated packed catalyst bed.

10 Claims, 5 Drawing Figures

METHOD OF CONVERTING HYDROCARBON WASTE GAS STREAMS USING A NON-UNIFORM CRIMPED METAL RIBBON PACKED CATALYST BED

This is a division of application Ser. No. 613,544 filed Sept. 15, 1975, now Pat. No. 4,065,268.

BACKGROUND OF THE INVENTION

This invention relates to an improved packed catalyst bed and to a method of converting hydrocarbon waste gas streams to carbon dioxide and water which utilizes this improved packed catalyst bed.

Under modern pollution control regulations, many waste gas streams which contain minor amounts of hydrocarbons require final cleanup and at least substantial conversion to carbon dioxide and water before they can be released to the atmosphere. In particular, in the oxidation of ethylene to ethylene oxide, a by-product vent gas stream containing about 1% ethylene by volume is removed from the reactor system. The ethylene contained in this waste stream is of too low a concentration to be recycled, and is normally vented to the atmosphere. However, in many localities, the ethylene contained in this stream must be converted to carbon dioxide and water before being released. Similar problems are encountered with the naphtha based solvents which are used in a wide variety of applications.

One method that has been frequently used in the past to treat these waste gas streams is to pass them through a packed catalyst bed containing a catalytically active metal catalyst such as platinum, palladium or the like. While many different types of supports have been used for the catalytic active metals, a frequently used support is a crimped metal ribbon. While a catalyst bed packed with a plurality of strands of uniformly crimped metal ribbon is successful in converting a large percentage of the hydrocarbon in the waste gas to carbon dioxide and water, it falls short of total conversion. One of the problems which is believed to limit the rate of conversion which can be attained with the uniformly crimped ribbon strands is the nesting of the strands, one inside the other. This apparently has the effect of reducing the surface area available for catalytic oxidation and is believed to be a cause of less than optimum conversion rates.

SUMMARY OF THE INVENTION

This invention relates to a catalyst bed packed with a crimped metal ribbon that does not all have the same crimp configuration. As used herein, the term "crimp configuration" refers to the spacial conformation or arrangement of crimps along a length of ribbon; that is, the combination of crimp size, shape and pattern of repetition. The crimped metal ribbon used heretofore for packed catalyst beds had a single, uniform crimp configuration; that is, it comprised a series of repeating units having essentially the same height, length and shape. In contrast, the packed catalyst beds of this invention have at least two different ribbon crimp configurations present in the catalyst bed. In other words, a portion of the crimped metal ribbon differs from the remainder of the crimped ribbon either due to a different crimp height, length or shape.

Preferably, the catalyst bed of this invention is packed with a plurality of crimped metal ribbon strands. Most preferably, three different crimp configurations are present in approximately equal number. The surfaces of these crimped strands are advantageously coated with a catalytically active metal, preferably platinum and/or palladium.

A catalyst bed packed with crimped metal ribbon that does not all have the same crimp configuration and that has been coated with a catalytically active metal such as platinum and/or palladium produces higher conversion rates for hydrocarbon waste gases at any given catalyst bed temperature than are produced with a catalyst bed containing crimped metal ribbon having a uniform crimp configuration. This unexpectedly higher rate of conversion means that the various pollution laws may be more easily complied with and that some waste gas streams can be essentially completely converted to carbon dioxide and water, a result which cannot be attained with a catalyst bed which uses uniformly crimped metal ribbon.

Another aspect of this invention relates to a method of converting hydrocarbons in waste gas streams to carbon dioxide and water utilizing the packed catalyst bed of this invention. In particular, this aspect of the invention relates to a method of converting the ethylene contained in a vent gas stream to carbon dioxide and water at conversion rates approaching 100% conversion. This aspect of the invention also relates to a method of converting waste gas streams containing naphtha-like solvents at higher conversion rates that can be attained with the uniformly crimped metal ribbon strands generally used heretofore.

DESCRIPTION OF PREFERRED EMBODIMENTS

Figure 1:
FIGS. 1 through 3 are enlarged edge views of three different metal ribbon strand crimp configurations which may be utilized in the packed catalyst bed of this invention.
Figure 2:
Figure 3:

The crimp configuration shown in FIG. 1 is approximately 1/16" high and has a repeating unit length of approximately 5/16". The term "repeating unit length" refers to the distance between successive peaks as indicated by the letter L in FIG. 1. The crimp configuration shown in FIG. 2 is approximately ⅛" high and has a repeating unit length of approximately ¼". The crimp configuration shown in FIG. 3 is approximately 1/16" high and has a repeating unit length of approximately ⅜". As can be seen from FIGS. 1 through 3, the crimp configuration illustrated in FIG. 1 also has a different shape than the crimp configurations shown in FIGS. 2 and 3. These latter two crimp configurations have approximately the same shape and are distinguishable from each other largely by the differences in height and repeating unit length.

Many other different crimp configurations may also be employed in the packed catalyst bed of this invention. Two different crimp configurations may even be present on a single strand. One end of the strand may have a given repeating crimp configuration while the other end has a different repeating crimp configuration. The crimp configuration of the metal ribbon strands may also be irregular or random.

The crimped ribbon strands intended to be used in the packed catalyst bed are formed from metallic ribbon.

Advantageously, this ribbon is from about 0.005 to 0.01 inch thick and is from about 1/16" to about ¼" wide. The strands may be of a variety of lengths, although an overall length of about 2 to 3 inches is preferred.

The metal ribbon is preferably crimped by passing it between two gears which impart the particular, repeating crimp configuration to the ribbon. A different pair of gears is used to create each individual crimp configuration.

The metal ribbon utilized for the various crimp configurations present in the packed catalyst bed of this invention is advantageously a mixed alloy ribbon. Particularly preferred combinations include ribbons made from nickel-chromium-iron, aluminum-chromium-iron, and chromium-silicon-iron alloys. Virtually any active catalytic metal may be applied to the metal ribbon intended to be used in this invention. Included among such catalytic metals are the elements of Group VIII of the Periodic Table, the rare earths, and other metals including silver, titanium, manganese, copper, chromium, cadmium, molybdenum, vanadium, tungsten, rhenium, thorium, and actinium. Particularly preferred active catalytic agents are platinum and palladium or mixtures thereof. The preferred methods of catalyst preparation are those disclosed in U.S. Pat. No. 2,720,494 to H. R. Suter or in U.S. Pat. No. 3,712,856 to the present inventor, the disclosure of which is incorporated herein by reference.

Active catalytic metal catalyts supported on a plurality of metal ribbon strands present in more than one crimp configuration in a packed catalyst bed produce extremely high conversion rates for hydrocarbons present in minor amounts in waste gas streams. For some systems, the conversion of the hydrocarbon waste gas to carbon dioxide and water is almost total.

Figure 4:
FIG. 4 is a plan view of a perforated metal ribbon.

In a preferred embodiment of this invention, at least a portion of the crimped metal ribbon strands are perforated. These perforations are advantageously very small, being on the order of about 1 to 5 mm. in diameter. One form of this preferred embodiment is shown in FIG. 4, which illustrates a top view of a perforated version of the crimp configuration of FIG. 3.

The packed catalyst bed of this invention is filled with crimped metal ribbon strands which do not all have the same crimp configuration. Preferably, at least three different crimp configurations are employed in the catalyst bed. Also preferred is the use of an approximately equal number of strands of each crimp configuration. A particularly preferred catalyst bed is one which is packed with approximately equal numbers of strands having the three crimp configurations illustrated in FIGS. 1 through 3. By employing such a variety of strands having different sets of heights, repeating unit lengths and angles, nesting of the strands is reduced significantly, thus permitting higher rates of oxidation to be attained.

The packed catalyst beds of this invention are not limited to any particular size or shape. For example, the crimped strands of this invention can be packed into pipe-, tube-, cylindrical- or rectangular-shaped catalyst bed, the full range of catalyst bed shapes and sizes being within the knowledge of those skilled in the art. The density of bed packing also extends over a wide range, although relatively densely packed catalyst beds are preferred.

The packed catalyst beds of this invention containing crimped strands coated with a platinum-palladium catalyst mixture are particularly advantageous for the conversion of the minor amounts of ethylene contained in the vent gas stream removed during the conversion of ethylene to ethylene oxide. Such catalyst beds permit higher rates of conversion of ethylene to carbon dioxide and water then can be attained with the uniform configuration metal ribbon strands used heretofore. This reaction can be carried out at atmospheric pressure and at temperatures on the order of 100°–400° C. The normal concentration of ethylene in the waste gas stream is from about 0.2 to 1.5% by volume, the remainder generally being air. The average hourly space velocities useful in this reaction can range from as low as about 1,000 upwards to about 25,000.

The packed catalyst beds of this invention are also extremely advantageous in the clean-up of waste gas streams containing naphtha-like solvents. In the conversion of naphtha-like waste gas streams, the packed catalyst beds described above produce higher rates of oxidation than can be attained with the uniformly crimped metal ribbon strands used heretofore.

EXAMPLE I

Figure 5:
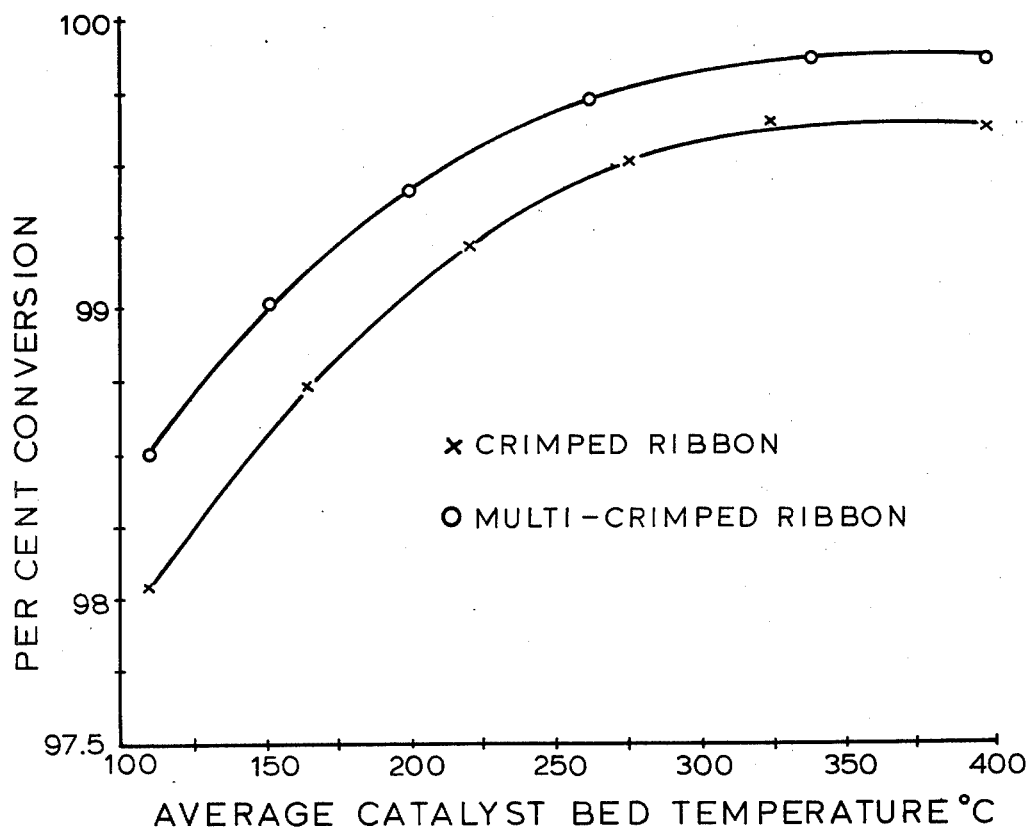
FIG. 5 is a graph showing the relationship between catalyst bed temperature and conversion based on test results employing uniform and non-uniform crimped metal ribbon.

FIG. 5 indicates the results of a series of experiments for the conversion of ethylene to carbon dioxide and water. This series of experiments indicates the improved conversion which can be attained when a catalyst bed is packed with crimped metal ribbon strands coated with a catalytically active metal and which are present in more than one crimp configuration.

These experiments were carried out under uniform reaction conditions. The same type of metal ribbon and catalytical active metal were employed. In this series of experiments, the ethylene concentration in the feed stream was 0.8% by volume while the remainder of the feed stream was air. The metal ribbon used in these experiments was made from a temperature resistant alloy containing chromium, aluminum and iron. The ribbon was approximately ¼" wide. The ribbon wass coated with a mixture of platinum and palladium. The method of coating the metal ribbon is described in U. S. Pat. No. 3,712,856. The crimped ribbon strands used in the uniformly crimped strand packed bed control series was about ¼" high and had a repeating unit length of about ¼". The strands averaged about 2½" in overall length. The strands used in the non-uniform crimp (multicrimped) packed bed had three different crimp configurations. One crimp configuration was the same as that used in the control series. Another crimp configuration had a height of about ⅜" and a repeating unit length of approximately ⅜". The third crimp configuration employed was about ⅛" high and had a repeating unit length of about ⅛". Approximately an equal number of strands of each crimp configuration were used. The length of the strands averaged about 2½" in overall length.

The various types of strands were prepared as indicated above and were placed in a packed bed catalyst cartridge. The etyhlene containing gas stream was passed through this packed catalyst bed at an hourly space velocity of 15,000 (ft$^3$/hr per ft$^3$ of catalyst bed including voids). Constant temperature reaction conditions were utilized at atmospheric pressure. The ethylene concentration in the feed gas and in the product stream was measured with an IPM model RS5 flame ionization detector manufactured by Inginingur Productions Gruppe Muenchen of Munich, Germany.

The results of these experiments are plotted in FIG. 5. As is shown in that FIGURE, the catalyst bed packed with the three different crimp configurations (indicated as "Mutli-Crimp Ribbon") produced a higher ethylene conversion rate at all of the catalyst bed temperatures tested than did the uniformly configured crimped ribbon. Furthermore, with this non-uniform configuration, conversion rates approaching 100% were attained. Such high rates of conversion were never attained with the packed bed having only a single strand configuration.

EXAMPLE II

A similar set of experiments was undertaken utilizing naphtha rather than ethylene. The same ribbon strand crimp configurations were used as were constant temperature conditions. Again, the same trend was observed; namely, the catalyst bed packed with the three different crimp configurations produced a higher percent conversion over the entire temperature range tested than was produced with the uniformly configured crimped ribbon strands.

Obviously, many modifications and variations of the invention as hereinbefore set forth will occur to those skilled in the art, and it is intended to cover in the appended claims all such modifications and variations as fall within the true spirit and scope of my invention.

I claim:

1. A method of converting unsaturated hydrocarbons in a waste gas stream to carbon dioxide and water which comprises passing the unsaturated hydrocarbon waste gas stream through a catalyst bed packed with catalytically active crimped metal ribbon at a temperature of at least about 100° C., wherein a substantial proportion of at least two different repeating non-random crimp configurations are present.

2. The method of claim 1, wherein the hydrocarbon is ethylene.

3. The method of claim 1, wherein the metal ribbon is an alloy of nickel, chromium and iron, aluminum, chromium and iron, or chromium, silicon and iron and wherein the surfaces of the metal ribbon are coated with a catalytically active metal.

4. The method of claim 1, wherein the temperature is between about 100° C. and 400° C.

5. The method of claim 4, wherein a substantial proportion of at least three different crimp configurations are present.

6. The method of claim 4, wherein the number of strands of each crimp configuration is approximately equal.

7. The method of claim 1, wherein the unsaturated hydrocarbon is present in a low concentration, the temperature is between about 100° C. and 300° C., the catalytically active crimped metal ribbon is formed from alloy metal ribbons selected from the group consisting of nickel, chromium and iron, aluminum, chromium and iron, and chromium, silicone and iron, and the catalytically active metal is a mixture of platinum and palladium.

8. The method of claim 7, wherein the unsaturated hydrocarbon is ethylene.

9. The method of claim 7, wherein a substantial proportion of at least three different crimp configurations are present.

10. The method of claim 7, wherein the crimped metal ribbon is perforated.

* * * * *